United States Patent [19]

Uddenfeldt

[11] Patent Number: 4,972,506
[45] Date of Patent: Nov. 20, 1990

[54] METHOD OF TRANSMITTING DATA INFORMATION IN A MOBILE, CELLULAR RADIO COMMUNICATION SYSTEM

[75] Inventor: Jan E. Uddenfeldt, Vällingby, Sweden

[73] Assignee: Telefonaktiebolaget L M Ericssson, Stockholm, Sweden

[21] Appl. No.: 311,900

[22] Filed: Feb. 17, 1989

[30] Foreign Application Priority Data

Mar. 15, 1988 [SE] Sweden ................................ 8800927

[51] Int. Cl.$^5$ ........................ H04Q 7/00; H04B 1/00; H04J 3/22; H04M 11/00
[52] U.S. Cl. ........................................ 455/33; 370/84; 370/95.1; 370/95.3; 370/79; 455/54; 379/59; 379/60; 379/63; 375/34; 375/58
[58] Field of Search .................. 455/33, 54; 370/95.3, 370/95.1, 84; 375/34, 58; 379/59, 60, 63; 371/2.1

[56] References Cited

U.S. PATENT DOCUMENTS 4,785,450 11/1988 Bolgiano et al. ...................... 455/54
4,866,710 9/1989 Schaeffer ............................ 370/95.1

FOREIGN PATENT DOCUMENTS 0210698 4/1987 European Pat. Off. .
0152904 12/1979 Japan ................................ 370/95.1
8808650 11/1988 PCT Int'l Appl. .................. 455/33
2182226 7/1987 United Kingdom .

OTHER PUBLICATIONS

"Digitales Mobilfunksystem for Jedermann", Funk-schau, pp. 47-50, 1/1985.

*Primary Examiner*—Joseph A. Orsino
*Assistant Examiner*—Kinfe-Michael Negash
*Attorney, Agent, or Firm*—Burns, Doane, Swecker & Mathis

[57] ABSTRACT

Method of transmitting data information in a mobile, cellular, radio communication system operating according to the TDMA principle. Within certain large cells (C2) in the system the number of calls in progress is less than the number of slots (CH1, CH2 . . . ) in each frame, where these slots have been allotted to the mobiles (M1) within the cell. The unoccupied slots thus occuring are utilised in accordance with the method such that the bit frequency (f) of the data information is reduced to a new value (f,) in response to the number of unoccupied time slots. The transmission range between mobile and base station is thus increased.

3 Claims, 3 Drawing Sheets

METHOD OF TRANSMITTING DATA INFORMATION IN A MOBILE, CELLULAR RADIO COMMUNICATION SYSTEM

TECHNICAL FIELD

The present invention relates to a method of transmitting data information in a mobile, cellular, radio communication system according to the time-division multiple access (TDMA) principle, i.e. the information is transmitted in frames, each containing a plurality of time slots. More specifically, the method is intended to improve the transmission between one or more mobile stations and a base station in the case where the distances between mobile and base stations are long.

BACKGROUND ART

In a mobile radio system operating according to the TDMA principle, data information is transmitted between a base station and one or more mobiles (mobile stations), with the data information containing call and other information such as synchronising, fault correction etc.

As mentioned, transmission takes place over a given radio channel, e.g. within the frequency range of 935–960 MHz in the form of frames, each containing a given number of time slots. The data information consists of a bit flow having a given rate e.g. 340 kbits/s, and between the different mobiles in the form of bursts corresponding to the time slots in a frame. Accordingly, a mobile is usually alloted a time slot in a frame during which the bursts are transmitted or received. A plurality of mobiles can thus transmit or receive over a given radio channel, i.e. radio frequency range.

The cellular system can be divided into large and small cells, where the small cells usually serve mobiles in a densely populated area, while the large cells serve sparsely populated areas. In spite of this, it is often the case that all time slots in a frame for mobiles within the small cells are occupied, whereas one or more of the time slots for the mobiles within the large cells are not occupied.

DISCLOSURE OF INVENTION

A problem with TDMA-type mobile radio systems is that the range is reduced by the high bit rate (340 kbits/s) in the data information flow. Of course, this applies primarily to sparsely populated areas, where a good range is desirable. As mentioned, the capacity requirement may be lower in the large cells where good range is needed. The mobiles have limited possibilities of increasing their output power, for reasons of space and cost, while there are afforded considerably greater possibilities of increasing the output power of the base stations.

The present invention utilises the mentioned fact that there can be unused capacity i.e. unoccupied times slots, in the communication between mobile-base station in sparsely populated areas where the need of good range is greater. In accordance with the invention, any unoccupied slots in each frame are utilised by reducing the bit frequency of the data information flow and distributing it over the extra slots as well as over the slot normally allotted to the mobile. This only applies to the mobile-base station transmission direction, while the base station-mobile transmission is retained unchanged, since the output power of the base station can be dimensioned to suit the maximum need required.

The method in accordance with the invention is distinguished by the characterizing part of claim 1.

BRIEF DESCRIPTION OF DRAWINGS

The invention will now be described with reference to the accompanying drawings, where.

BEST MODES FOR CARRYING OUT THE INVENTION

The inventive method is intended for a digital, TDMA mobile radio system. A known such system in which the inventive method can be applied includes a plurality of fixed base stations and a plurality of mobiles, which can be in mutual communication over given radio channels. The base stations can transmit radio signals on a plurality of radio channels within the frequency range 935–960 MHz, and the mobiles can transmit radio signals on a plurality of channels within the frequency range 890–915 MHz. Transmission on the channels is divided into frames and time slots according to FIG. 1, such that each frame has a duration of approximately 8 ms and has 10 slots, each with a duration of 0.8 ms. One or a small number of the channels is used in the base stations for co-ordinated control and transmission of general information to the mobiles. However, the method of this invention is not primarily intended for application to this transmission direction, since there is not the same limitation on the transmission power from the base station to the mobiles as there is for the other direction.

Figure 1:
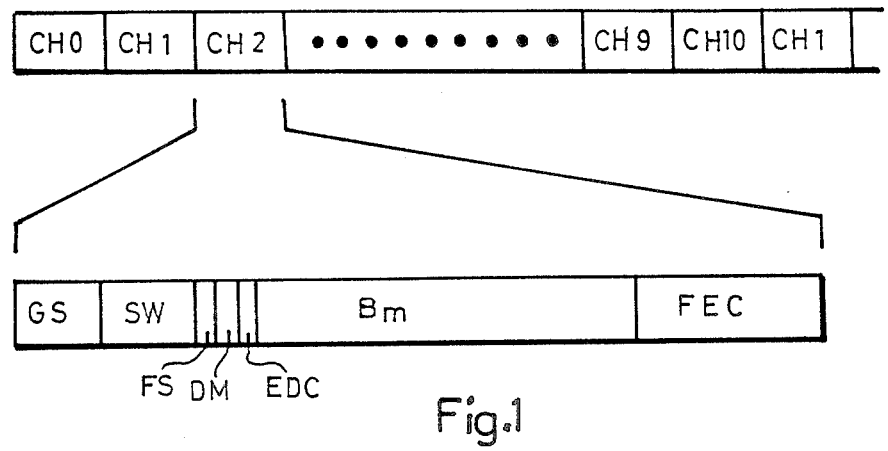
FIG. 1 illustrates a radio channel with 10 time slots in a frame, as well as the contents of a time slot.

In an allotted time slot on a radio channel a mobile can transmit a burst, the contents of which may be situated in the slot CH2 in FIG. 1. The information transmission rate for a burst from a mobile is 340 kb/s, and a 0.8 ms slot thus accomodate 272 bits. Of the slot, a first part GS with a duration corresponding to 28 bits is utilised as a guard space for reliably separating bursts in different slots from each other. A first part of the burst, corresponding to 38 bits is used for synchronising patterns SW and FS. A part DM corresponding to 8 bits is used for control information or packet data, and a part $B_m$ corresponding to 128 bits is used for a speech channel or the like. Fault correcting coding is applied, both for control information or packet data and for the speech channel and the like, which requires a part EDC corresponding to 6 bits, and a part FEC corresponding to 64 bits. With fault-correcting coding of the speech channel or the like, bits from four corresponding time slots are interleaved in four successive frames.

Figure 2:
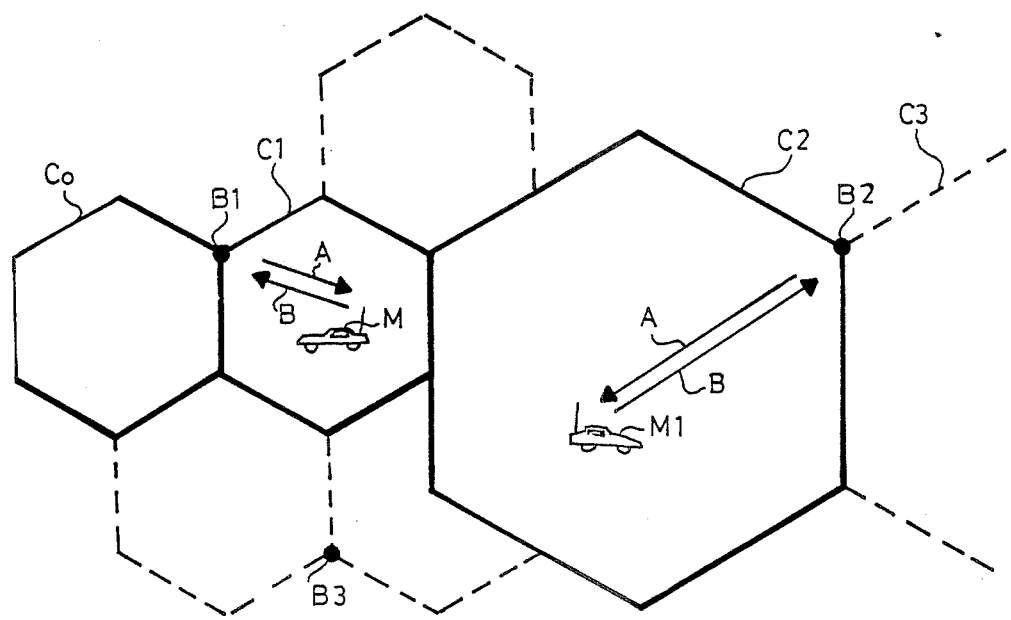
FIG. 2 illustrates a part of a mobile, cellular, radio communication system in which the inventive method is applied, FIG. 3 exemplifies, for a given radio channel, the different bit positions in three different time slots included in a given frame.

FIG. 2 illustrates a part of a mobile, cellular radio system in which the inventive method is applied. The cells C0 and C1 are small cells, and are assumed to cover a densely populated area, e.g. a suburban or urban area where the subscriber density is great. The base station B1 is common to the two small cells C0 and C1, and a mobile M in the cell C1 is assumed to communicate with another stationary or mobile subscriber (not more closely illustrated). Since the number of subscribers in the areas of cells C0 and C1 is great, there is small probability that there is any unoccupied space, i.e. an unoccupied slot in each frame on the channels over which communication to and from the mobile takes place. The inventive method is therefore not applicable to this area, and neither is there any need to increase the output power of the mobile.

It is also assumed that the large cells C2, C3 are also included in the system, these cells covering a larger area than cells C0 and C1. The subscriber density for each of the cells C2 and C3 is assumed to be so low that it is lower than that for either of cells C0, C1. Accordingly, a base station B2 can serve greater area than B1, but fewer mobile subscribers. However, there is here the problem that a mobile M1 in cell C2 can be so far from the base station B2 that the signals it sends (direction B) are not sufficiently strong on reception at B2 for them to be detected reliably. The output power of the mobile must therefore be increased, which can involve difficulties with respect to limited possibilities of providing the mobile with a sufficient power feed to its transmitter. Since the number of mobile subscribers within the cell C2 area is comparatively small, compared with the cells C0, C1, the subscriber density is small, and the probability is large that at least one or more slots in each frame is empty. These are the conditions utilized by the inventive method. The signal sent from the base station B2 to the mobile M1 can be sufficiently strong for detection by the mobile M1, and in such a case the method does not need to be utilised in this communication direction (direction A in FIG. 2).

Figure 3:
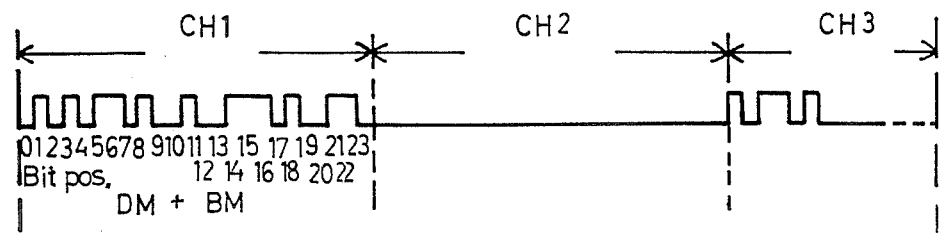

FIG. 3 illustrates in more detail the bit flow in a slot in a frame for a given channel, followed by an empty slot, e.g. corresponding to the slots CH1 and CH2 in FIG. 1. For the sake of simplicity, it is assumed that the slots only take up 24 bit positions. The channel is utilised for communication within the cell C2 area, and according to what has been said above, occupation is so low that there the probability of there being an empty slot is great. It is therefore assumed that the slot CH2 is the empty one, but it could equally as well be slot CH3 or any other slot.

Figure 4:
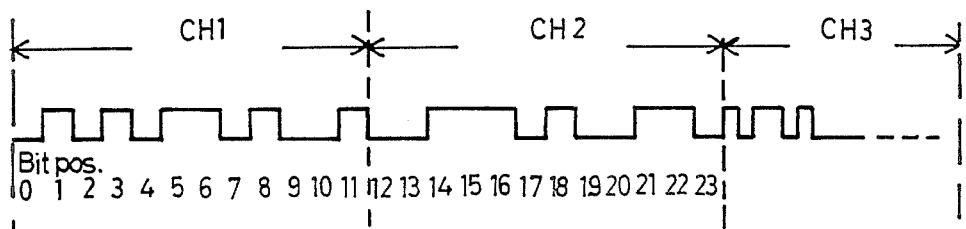
FIG. 4 illustrates the same channel as in FIG. 3, with the inventive method applied to the positions of the different bits.

FIG. 4 illustrates more closely the principle of the inventive method applied to the bit flow of FIG. 3. Both FIG. 3 and FIG. 4 show a radio channel at disposal for communication from a mobile to a base station, e.g. from M1 to B2. When B2 indicates that the signal from M1 is too weak for correct detection, a control signal is sent from B2 to the mobile, this signal causing the mobile's bit frequency to change. This signal is received by the mobile with some form of time indication just before the slot CH1 (according to FIG. 4) alloted to the mobile is about to be transmitted, and the control signals is placed in the field DM, for instance. In the example illustrated in FIG. 4 the pulse frequency of the bit flow is changed so that the next following slot CH2 is completely filled with the bit positions which were earlier associated with slot 1 (see FIG. 3), i.e. the pulse frequency has been halved. This results in that the energy content for each bit position has been doubled, thus increasing the range of the signals from the mobile M1 to the base station.

The inventive method thus means that one or more empty slots in a frame are utilised to reduce the frequency of the pulse flow sent from the mobile by a factor m. If the number of unoccupied slots is n and the frequency of the bit flow before reduction is f, then the reduced frequency $$f_r = f/m,$$

where $m = n + 1$.

Figure 5:
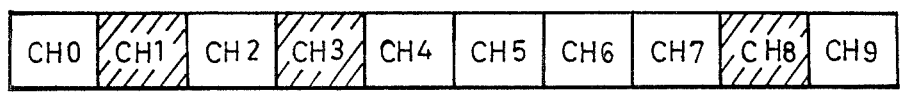
FIG. 5 illustrates a variant of the inventive method applied to a channel other than the one illustrated in FIGS. 3 and 4.

It is not necessary for the unoccupied slots to follow directly upon each other in the frame, and the method can be applied to optionally distributed slots. FIG. 5 shows the same frame as in FIG. 1, where the slot CH1 is the one normally occupied by mobiles, and here the shaded slots CH3 and CH8 are unoccupied and can be used for transmitting the bit flow. The latter is thus spread out over three slots (m=3), although they are not consecutive in the frame.

The base station B2 measures the field strength received from the mobile M1 transmitter continously, and thus apprehends whether the mobile moves further away or nearer to the base station. In the latter case it is suitable for the base station B2 to send a lower value for m, i.e. the value is made adaptive in response to the distance of the mobile from the base station.

Figure 6:
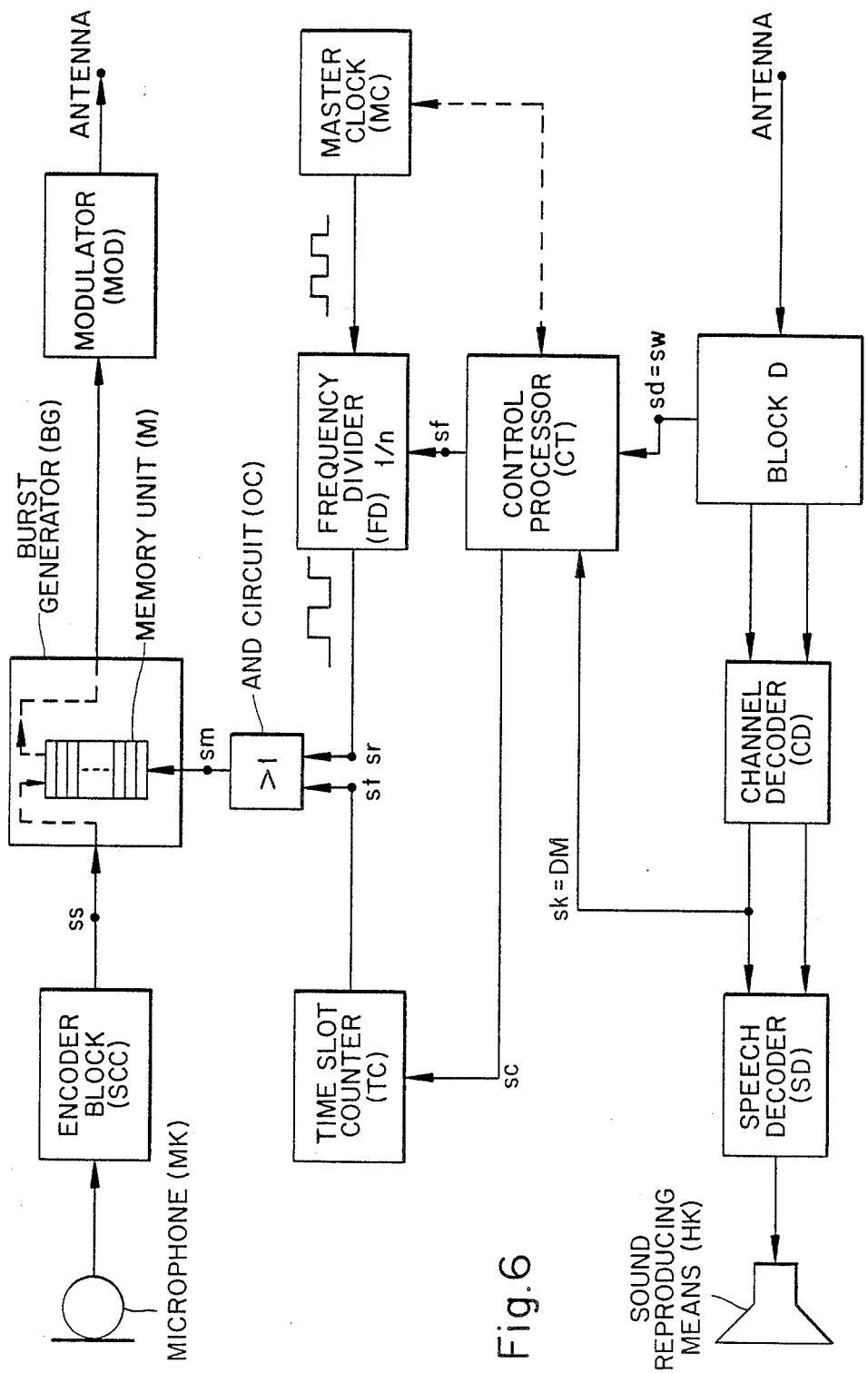
FIG. 6 is a simplified block diagram of a part of a radio receiver applying the method in accordance with the invention.

FIG. 6 is a block diagram of the part of a mobile in which the inventive method is applied. The mobile has transmitting and receiving sides, and its basic units are described in such as the Swedish patent application No. 8703796-6 now the Swedish Patent No. 459137.

The transmission side includes a microphone MK or other means for taking up sound connected to a block SCC, which includes here a speech encoder, for sampling and digitalising sound signals from the means MK, and a channel encoder in which an interleaved fault-correcting coding is made of the digital signals from the speech encoder. The output signal ss from the block SCC is taken further to a burst generator BG which, in the known case, generates short bursts of digitally coded signals at the information transmission rate, i.e. with the pulse frequency f according to what has been said (f=340 kb/s in the normal case). The timing of the bursts is controlled by a time slot counter TC.

In the present case there is a memory unit M in the burst generator BG for feeding in and storing the different bits of the digital signal ss, and the unit M is controllable such that in response to the control signal sm the stored bit flow to a following modulator MOD is started and stopped at the feed-out instants. The modulator is conventionally connected to the mobile's antenna via an amplifying unit and a transmit/receive switch (not shown in FIG. 6).

For carrying out the method in accordance with the invention the transmitting side has been supplemented by a frequency divider FD, the output of which is connected to a clock input on the memory unit M in the burst generator, and its input is connected to a master clock MC. This clock is already available in the mobile, inter alia for timing its control processor CT. The timing is derived from the pulses of the master clock for when the burst generator feeds out the individual data bits in each time slot, i.e. the rate at which the information transmission takes place, e.g. 340 kb/s.

The receiving side of the mobile contains a block D, which includes a high-frequency part, a coherent demodulator and an analogue-digital (AD) converter, known per se, and conventionally connected as described in the above-mentioned patent. In addition there is an equalizer in Block D for conventionally adapting the received, regenerated data signals and correcting deficiencies in the transmission medium (time dispersion). The block CD represents a channel decoder which can execute fault-correcting decoding of the signals from the equaliser in block D. The channel decoder CD here generates decoded digital signals with an information transmission rate of 16 kb/s. The channel decoder CD is connected to a speech decoder SD, which generates an analogue signal to a sound reproducing means HK in response to the decoded digital signals from the channel decoder.

The signals which are available at the output of the channel decoder contain correct information from the base station in the appropriate time slot for the mobile, i.e. they contain the information DM, EDC, Bm and FEC. The part Bm is reserved for the actual call information and FEC for its fault correction. For obtaining control data at the mobile with the object of changing the bit frequency in transmission to the base station in accordance with the method, control information must be put into the field DM on transmission from the base station to the mobile.

The field EDC in FIG. 1 is normally reserved for parity bits for DM fault correction, but when necessary it can be used for transmitting the required control information to the slot counter TC from the mobile's control processor CT. The signal sk obtained from the output signal of the decoder CD thus also contains control data for the control processor CT, which in turn sends a control signal sc to the slot counter TC. The control signal sc gives the start and stop instants for a slot, and is obtained as a result of the evaluation of the signal sk by the control processor CT. There is namely in this signal information as to the number of slots that are empty in a frame, apart from the slot normally assigned to the mobile. Information as to the unoccupied slots in the frame can be given by the slot numbers of these extra slots (which can be put in as binary levels in the signal sk).

The control processor CT is conventionally given a synchronising signal sd corresponding to the field sw (see FIG. 1) from the block D, and it also knows the time interval for a slot CH0–CH9. A control signal sc can thus be produced from the control signals sd (SW) and sk and is taken to the slot counter TC, which gives start and stop instants for the normally assigned slot, e.g. CH1, and for the extra slots (CH3, CH8 in the example of FIG. 5). The output signal st from the slot counter TC consists, for example, of a "one" for the duration of a slot.

There is a frequency divider FD with its input connected to the output of mobile's master clock MC for dividing down the bit frequency during the slots which are assigned (normal plus extra) in the inventive method. The master clock MC is normally used for sending timing pulses or clock information to the control processor CT. The division factor of the frequency divider FD is controlled by the processor CT so that the division takes place in the right frame and for the slots which have been assigned to the mobile. The control signal sf to the divider can be the same as sc to the slot counter, since it contains information on the start and stop positions, or it can be a signal obtained from sc after processing in the control processor for obtaining information as to the correct division factor. FIG. 6 shows the latter case i.e. the signal sf contains information as to start/stop and the division factor for the divider FD.

The signal sr from the frequency divider FD thus gives the bit frequency during the normally assigned slot CH1 as well as the extra slots CH3, CH8. An AND circuit OC can be connected between the outputs from the slot counter TC and divider FD and the input to the memory M in the burst generator BG for securing the start and stop instants. Feed-out of the stored information from the coded speech signal ss thus takes place with a bit frequency $f_r = f/m$ if a notice is received from the base station that n unoccupied slots are available, wherewith $m = n + 1$ and f is the normal bit frequency. Accordingly, if in the example in FIG. 2 only one extra slot has been allotted, the bit frequency is halved, whereas in the example in FIG. 5, with two extra allotted slots, the frequency is reduced to 1/3 of the normal value.

In the method described above, information is sent as to the number of unoccupied slots and their positions in the frame at the beginning of a slot (the field DM). However, the base station can transmit this information over the outgoing ringing channel so that already at the ringing procedure the mobile regulates the number of transmitted slots, instead of at the beginning of the call transmission itself. Regulation of the slots is performed by the control processor CT, which, as with previous case, obtains information from the output of the channel decoder CD (the signal sk). From the base station it is also possible to change the value of m during the course of the call, i.e. $m = m_1$ is selected for a given number of slots, and $m = m_2$ where $m_1 \neq m_2$ is selected for subsequent slots. The mobile can, for example, have moved towards or away from the base station.

I claim:

1. Method of transmitting in a cellular mobile radio system a radio communication message which is communicated according to the time division multiple access (TDMA) principle with a predetermined bit frequency in frames, each containing a number of time slots carrying radio communication message, the system communicating said messages in cells each served by a base station and having various degrees of utilization for a given cell, the number of time slots in each frame being greater than the greatest number of radio communication messages in progress between the mobiles in a cell and said base station serving that cell, said method including:
    extending the radio communication message from a certain mobile to said base station beyond the ordinary time slot allocated to said mobile in a frame by allocating further time slots within said frame for said mobile, at least one of said further time slots being occupied by said radio communication message in dependence on the distance of the mobile to the base station, and reducing said predetermined bit frequency from its ordinary value to a new value dependent on the total number m of allocated time slots in a frame.

2. Method as claimed in claim 1, wherein the time slots in said total number m of time slots in a frame are positioned directly one after the other within the frame, and wherein the bit frequency is reduced by a factor 1/m.

3. Method as claimed in claim 1, wherein the time slots in said total number m of time slots in a frame are not positioned directly one after the other but are interleaved with occupied time slots which are allocated to other mobiles in said cell.

* * * * *